(No Model.)
C. E. MOLLER & C. RAETTIG.
LINE GUIDE FOR FISHING REELS.
No. 401,049. Patented Apr. 9, 1889.
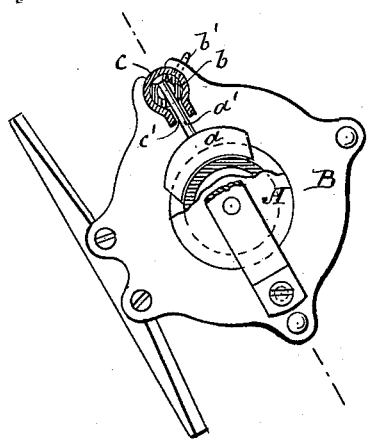
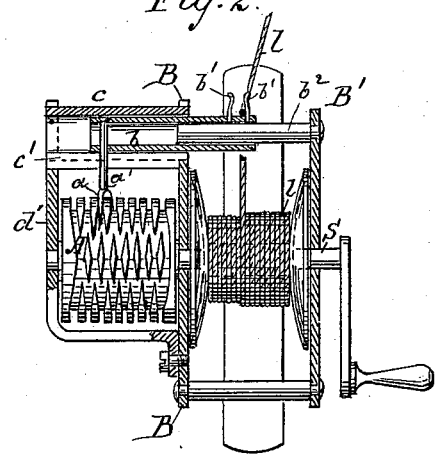
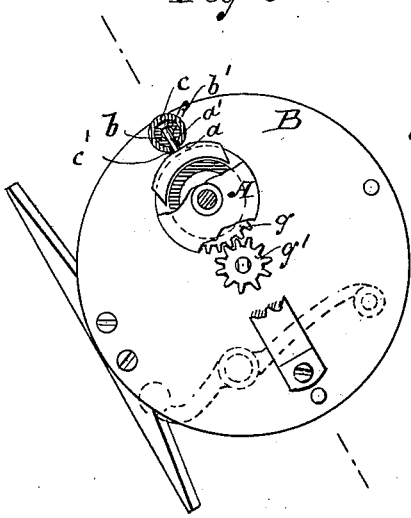
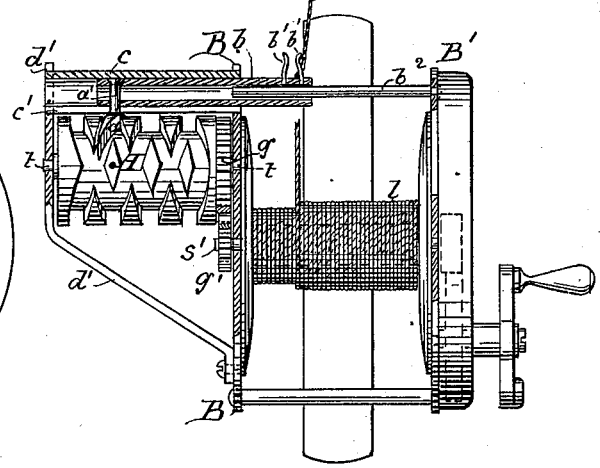
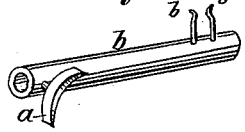
Witnesses.
A. Doerflinger
J. A. Sanchez
Inventors:
Christian E. Moller
Charles Raettig

UNITED STATES PATENT OFFICE.

CHRISTIAN E. MOLLER, OF HOBOKEN, NEW JERSEY, AND CHARLES RAETTIG, OF NEW YORK, N. Y.

LINE-GUIDE FOR FISHING-REELS.

SPECIFICATION forming part of Letters Patent No. 401,049, dated April 9, 1889.

Application filed October 29, 1888. Serial No. 289,447. (No model.)

*To all whom it may concern:*

Be it known that we, CHRISTIAN E. MOLLER, a citizen of the United States, and a resident of Hoboken, in the county of Hudson and State of New Jersey, and CHARLES RAETTIG, a citizen of the United States, and a resident of New York, in the county of New York and State of New York, have invented certain new and useful Improvements in Automatic Line-Guides for Fishing-Reels, of which the following is a specification.

Our invention relates to fishing-reels; and it consists of an automatic line-guide which is given a reciprocating motion by the action of the crank which operates the reel, so as to effect an even distribution of the fishing-line on the spool when the line is pulled in.

At the present time fishermen give the oscillating motion to the line with two fingers of the left hand, in which at the same time they generally hold the fishing-rod, while with their right hand they operate the crank which draws the line in. In the excitement incidental to the attention they have to give to the motions of a fish just caught, following its motion up by slowly drawing in and then letting go of the line for a short period, the necessary motion of the left hand is often forgotten, and consequently the line crowded at one place gets crossed and jams and clogs entirely, in the end causing the loss of many fish. To avoid this and at the same time free the sportsman from the care he has to give to this feature while pulling the line in, we have provided an automatic line-guide illustrated in the accompanying drawings, of which—

Figure 1 is a side elevation, partly in section, of a small reel with our attachment. Fig. 2 is a front elevation of the same. Fig. 3 is a side elevation of a larger reel with our attachment. Fig. 4 is a front elevation of Fig. 3. Fig. 5 is a perspective view of our guide disconnected from the reel.

Similar letters refer to similar parts throughout.

In small reels, Figs. 1 and 2, we apply to the spool-shafts at the opposite side from the crank a cylinder, A, upon which is cut a right and left screw-thread with return-cams at each end, such as used for other purposes at the present time. The follower $a$ we place in a small tube, $b$, which fits over the upper stay-rod, $b^2$, of the reel, the metal around this stay-rod in the left reel-frame, B, having been removed to such an extent as to allow for the insertion of this guide-tube $b$ and an exterior guide-tube, $c$. The latter fits closely around $b$ and is slotted at the bottom, so as to permit the passage of the shank $a'$ of the follower $a$. A bracket, $d$, Fig. 2, or $d'$, Fig. 4, is secured below to the reel-frame B, and suitably bent and secured at its upper end to the outer guide-tube $c$, the other end of which is secured in B. This bracket $d$ also contains the journal for the outer trunnion of the screw-cylinder A. The tube $b$ in its starting position projects slightly to the right of the reel-frame B, and has mounted thereon at right angles to its axis the two clamp-pins $b'$ $b'$, between which the fishing-line $l$ is guided to and fro when the crank is operated.

In larger reels, Figs. 3 and 4, to avoid a screw-cylinder of too large diameter, two gear-wheels, $g$ $g'$, are employed, which preferably are of different diameter, the smaller one being secured to an outer projection of the spool-shaft $s'$, while the larger wheel is connected to the screw-cylinder A, whose trunnions $t\,t$ are mounted in reel-frame B and bracket $d'$. The remaining mechanism is exactly the same as that employed for smaller reels. In operating our invention the turning of the crank will revolve the spool-shaft $s$ and simultaneously the screw-cylinder A. The follower $a$, with the guide-rod $b$ and clamps $b'$ $b'$, will thereby be propelled right and left in turns, although the crank is always moving in one direction. The fishing-line having been placed between the clamp-pins $b'$ $b'$ will be compelled to follow this motion, and thereby automatically wind up perfectly even on the spool, relieving the mind of the sportsman and allowing him to concentrate his attention upon the motion of the fish just caught. In throwing out the line the sportsman is at liberty to leave it in the clamps or take it out of the same.

It is evident that the form of the line-guide $b$ is not confined to the tubular shape, but it may be a solid bar or have any suitable shape, and at the same time the outer guide-tube, $c$, and the stay-bolt $b^2$ may be changed accordingly, to suit the requirements of the changed form of $b$, the follower $a$ and the pins $b'\,b'$ remaining unchanged in their relative positions. The bracket $d'$ may also be extended as a casing, covering all the projecting parts.

We are well aware that line-guides have been used in various combinations on fishing-reels and operated by the aid of screw-cylinders, and therefore do not broadly claim these combinations; but

What we claim, and desire to secure by Letters Patent, is—

1. In a fishing-reel, the combination of a tubular line-guide, $b$, having a follower, $a$, and pins $b'\,b'$, protruding through the left side of the reel-frame B and guided at one end by the upper stay-rod, $b^2$, over which it passes, and at the other by a slotted tube, $c$, supported by a bracket or casing, $d'$, mounted upon the outer left side of the reel and operated directly by means of a return screw-cylinder, A, mounted on the spool-shaft $s$, with the fishing-line $l$, as and for the purposes herein shown and set forth.

2. In a fishing-reel, the combination, of a tubular line-guide, $b$, having a follower, $a$, and pins $b'\,b'$, protruding through the left side of the reel-frame B and guided at one end by the upper stay-rod, $b^2$, over which it passes, and at the other by a slotted tube, $c$, supported by a bracket or casing, $d'$, mounted upon the outer left side of the reel and operated by the aid of a return screw-cylinder, A, arranged at the left side of the reel with the line $l$, as and for the purposes herein shown and described.

Signed at New York, in the county of New York and State of New York, this 25th day of October, A. D. 1888.

CHRISTIAN E. MOLLER.
CHARLES RAETTIG.

Witnesses:
H. C. MERKLEN,
D. C. ANDREWS.